United States Patent [19]

Dotsko

[11] 4,348,187

[45] Sep. 7, 1982

[54] AERIAL IMAGE VISUAL DISPLAY

[75] Inventor: Martin Dotsko, Binghamton, N.Y.

[73] Assignee: The Singer Company, Binghamton, N.Y.

[21] Appl. No.: 174,091

[22] Filed: Jul. 31, 1980

[51] Int. Cl.³ .............................................. G09B 9/08
[52] U.S. Cl. ........................................ 434/44; 352/86;
352/132; 353/99
[58] Field of Search ..................... 434/44; 352/43, 86,
352/132, 69; 353/99

[56] References Cited

U.S. PATENT DOCUMENTS

| | | | |
|---|---|---|---|
| 3,536,832 | 10/1970 | Zipse et al. | 352/86 X |
| 3,557,470 | 1/1971 | Emerick et al. | 434/44 |
| 3,820,873 | 6/1974 | Redington et al. | 352/86 X |
| 4,068,922 | 1/1978 | Dotskoi | 350/126 |

FOREIGN PATENT DOCUMENTS 280549  5/1952  Switzerland ........................ 352/86

Primary Examiner—William H. Grieb
Attorney, Agent, or Firm—Jeff Rothenberg; Douglas M. Clarkson

[57] ABSTRACT

This disclosure describes an apparatus for an optical visual display in a simulator training apparatus to develop a realistic infinity virtual image. Two spherical mirrors are positioned facing each other a multiple of their radius apart so that an image projected from above will be focused by one mirror so that an observer viewing the other of the two spherical mirrors will see an infinity virtual image. A modification of this arrangement is described also as providing a tilt in the projected image to develop a startling three-dimensional effect in the viewed image. A modification of this arrangement is described also as providing dual viewing of two differing infinity virtual images utilizing a single optical system.

9 Claims, 4 Drawing Figures

AERIAL IMAGE VISUAL DISPLAY

BACKGROUND OF THE INVENTION

The present invention, generally, relates to simulator training apparatus and, more particularly, to such simulator training apparatus having an optical visual display.

Optical visual display systems in simulators for training purposes have enjoyed widespread use in the past, and such use has increased dramatically in the more recent years. One reason for this increase in use of optical visual display systems in simulators is the increase in technology available today.

It is a constant objective in the simulator manufacturing field to provide as much realism for a trainee in a simulator as he would expect to encounter in an actual vehicle. This is particularly true in simulators of military vehicles where the trainee must locate visually targets over a wide field of view. It is desirable also to have an infinity image display to make the scene viewed even more realistic.

Vehicle simulators are used to simulate the actual motion of a vehicle in order that one or more trainees may obtain experience without the use of an actual vehicle. The present invention is applicable to aircraft flight simulators and also is applicable equally to simulators for other vehicles and to apparatus generally for simulating a real life situation.

It was a significant improvement in flight simulation and similar display systems when collimation of the displayed image was achieved, that is, by making all image points appear to be at infinity. While this technical advance did much to achieve improved realism, a problem still exists in providing three dimensional scenes. This problem was not so much solved as it was relieved by the technical advance to provide increased perspective in an optical scene that is viewed. For example, an aircraft runway is given an illusion of depth by making the end of the runway nearest the pilot broader with the edges of the runway converging at a distant point even though all points of the runway are imaged at infinity.

SUMMARY OF THE INVENTION

Accordingly, it is an object of the present invention to provide an apparatus for certain visual displays which overcome limitations of the known systems described above.

Another object of the present invention is to provide an optical system to increase realism of depth in a viewed infinity image. It is also an object of the present invention to provide an optical system to permit dual viewing of two differing infinity images by means of a single optical system.

A principal object of the present invention is to provide improved apparatus for developing a realistic aerial image.

An optical visual display arranged in accordance with the principles of the present invention includes a first concave spherical mirror and a second concave spherical mirror, the second concave spherical mirror being positioned relative to the first mirror so that its concave mirror can focus at infinity a predetermined visual scene focused by the first spherical mirror as an aerial image. A suitable projection means develops the predetermined visual scene which is focused by the first concave spherical mirror as an aerial image at the focal point of the second mirror. An observer's position faces the second concave spherical mirror and is located quite close to the center of curvature, closer than permitted by prior arrangements since the observer is able to view the infinity image without any vignetting by the aerial image.

Other objects, aspects, features and advantages of the invention will be pointed out in part, and will be apparent in part, in the following detailed description, taken along with the accompanying drawings.

THE DRAWINGS

THE PRESENTLY PREFERRED EMBODIMENT

Figure 1:
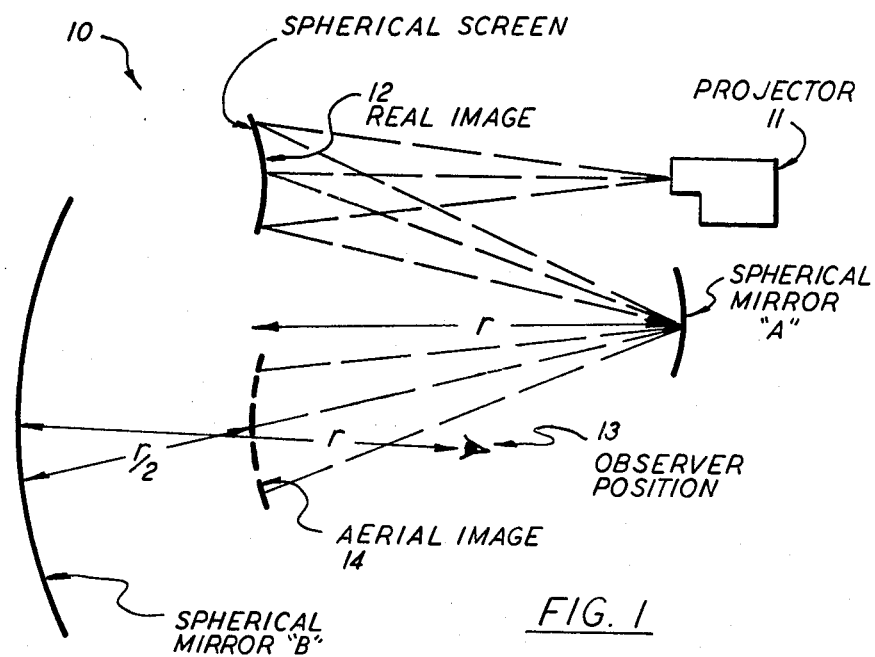
FIG. 1 is a side view in elevation showing the component parts of an optical visual display arranged in accordance with the principles of the invention.

In FIG. 1 of the drawings, the numeral 10 identifies the optical visual display of the invention generally. The same reference numerals will be used in the various views to identify the same or similar component parts.

A projector 11 can be any desired type, its primary function being to generate an appropriate scene for viewing. The projector 11 produces a real image on a front projection spherical screen 12, which image is focused by spherical mirror "A" as aerial image 14.

An observer's position is identified by the numeral 13 and is positioned continguous with the center point of a second spherical mirror "B". While the observer's position 13 is not located at the center of curvature of mirror "B", it is closer to this center than permitted by previous arrangements where a projection screen would be located at the aerial image position 14.

From this observer's position 13, the aerial image focused by the spherical mirror "A" may be viewed by looking into the spherical mirror "B", and a virtual image will appear focused at infinity since the aerial image is at a point one-half the radius of the spherical mirror "B". This aerial image is identified by the reference numeral 14 and is located a distance from the spherical mirror "A" equal to its radius.

The spherical screen 12 is positioned a distance in front of the spherical mirror "A" equal to its radius. By an arrangement in accordance with this invention, the aerial image is the same size as the real image on the screen 12.

Since the dimension from a person's eyepoint to the top of his head, hat or helmet is substantially less than the dimension from his eyepoint to the floor on which he stands or sits and since, by an arrangement in accordance with the principles of the invention, the observer's position 13 may be placed closer to the center of curvature of the spherical mirror "B" than heretofore permitted, an important feature of this invention is that the projector 11, the screen 12, and the mirror "A" are all located above the observer's position 13.

Figure 2:
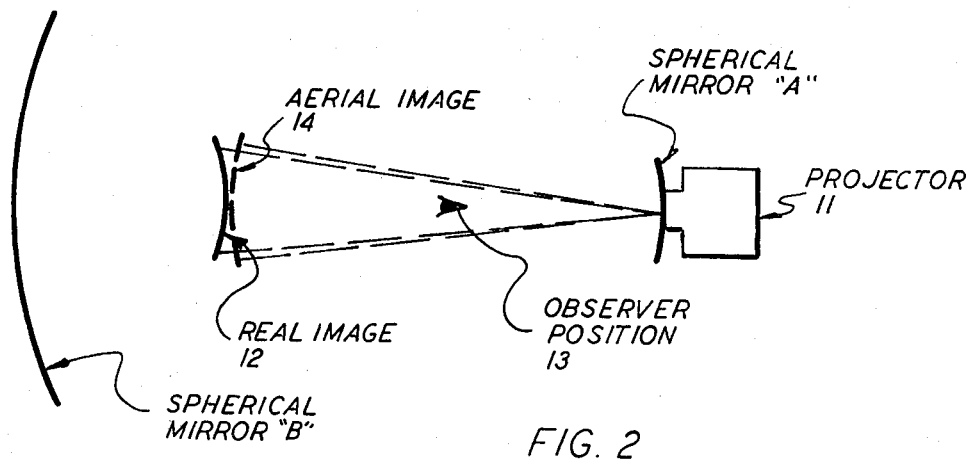
FIG. 2 is a top view of FIG. 1.

In FIG. 2, the same component parts and the relative arrangement of each is illustrated in this figure from the top view of FIG. 1, and therefore, the same reference numerals and legends are applicable.

Figure 3:
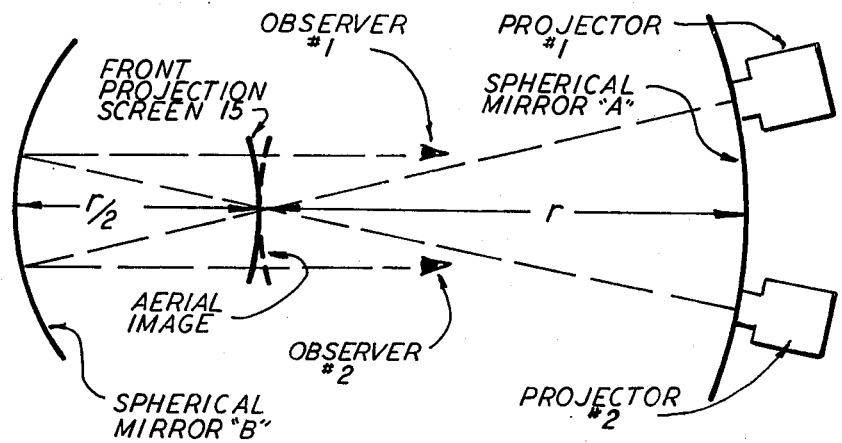
FIG. 3 is a top view, similar to that shown in FIG. 2, but with two projectors, as a modification of the invention.

In FIG. 3, an arrangement is illustrated similar to that of FIG. 2, i.e., a top view of an optical visual display system, using, however, two projectors, identified in FIG. 3 as projector No. 1 and projector No. 2. This arrangement is used when two observer positions are required, observer position No. 1 and observer position No. 2.

A front projection screen 15 is used which is of a particular construction, which, by virtue of its highly directional light reflectance properties, permits dual viewing of two or more differing scenes. One such screen is taught in U.S. Pat. No. 4,068,922 which is assigned to the assignee of the present invention. By such a screen, two observers in the two identified positions will see two differing infinity images with a single projection screen 15.

In many types of aircraft, particularly those carrying passengers, there is a pilot's position and a co-pilot's position, and a slightly different scene is visible from each of these two positions. Therefore, an arrangement such as illustrated in FIG. 3 of the drawings is used to develop the two images needed but with a single projection screen.

Figure 4:
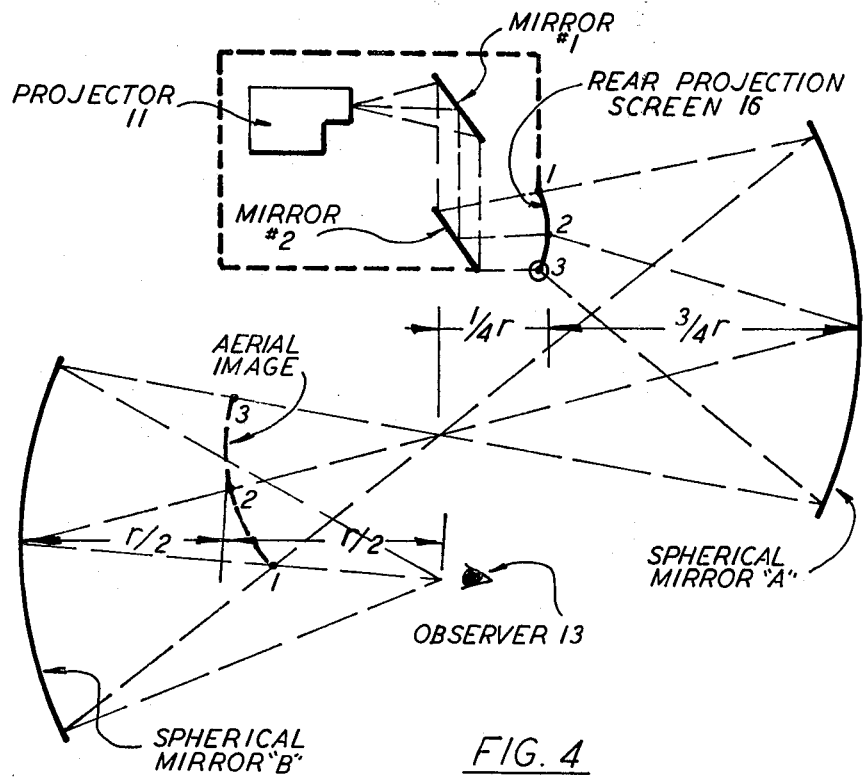
FIG. 4 is a view similar to that shown in FIG. 1 but with a modified projection means.

In FIG. 4 of the drawings, still another feature of the invention is illustrated. In this view, the single projector 11 projects a predetermined visual scene onto a folding mirror No. 1 from which it is directed to another folding mirror No. 2 to project the image onto a rear projection screen 16.

With a real image on the projection screen 16, a magnified aerial image 14 is developed by the arrangement of spherical mirrors "A" similar to that explained in connection with FIG. 1 of the drawings. Thus, an observer at the position 13 may look effectively through the aerial image 14 and observe the virtual image as if it were at infinity. As an example, assume that the observer 13 is a pilot flying in an aircraft and the scene being observed is a virtual image of an airport landing strip. As noted previously, perspective is developed by projecting scenes at infinity with those in the nearer field of view being larger than those at a distance.

However, with an arrangement as illustrated in FIG. 4, assume that the projector 11, the mirror No. 1, the mirror No. 2 and rear projection screen 16 are pivoted slightly about a point No. 3 so that point No. 1 of the rear projection screen moves toward mirror "A". The change in the virtual image viewed by the observer 13 is startlingly realistic in that it becomes a three-dimensional view.

Therefore, the greater the degree of pivot of the projector 11, the mirror No. 1, the mirror No. 2 and rear projection screen 16 about the point No. 3 in FIG. 4, the greater the three-dimensional effect developed in the virtual image, until, as an extreme example, the near end of the landing strip comes right into the cockpit with the pilot while the far end of landing strip will appear to be at a greater distance from the pilot. Restraint must be exercised in order to maintain such a scene in realistic proportions, and returning the projector to its original position will return the virtual image to what then will appear as a most unsatisfactory and flat view with all points focused at infinity.

In view of the above detailed description of the presently preferred form of the invention and in view of the above-mentioned modifications thereto, other modifications, variations, advantages and uses will occur to one skilled in the art. Accordingly, the description and modifications presented hereinabove are to be considered as illustrative only, the true spirit and scope of the invention being that defined by the claims appended thereto.

I claim:

1. In a simulator training apparatus having an optical visual display to develop a realistic aerial image, said visual display comprising:
    a first concave spherical mirror positioned to focus a predetermined visual scene as an aerial image located a distance from said first mirror equal to its radius,
    a second concave spherical mirror positioned on the opposite side of said aerial image from said first mirror and located a distance from said aerial image equal to one-half its radius, so that its concave mirror surface can focus at infinity said predetermined visual scene focused by said first spherical mirror as said aerial image,
    means to project said predetermined visual scene for focusing by said first concave spherical mirror as an object for said second concave spherical mirror,
    an observer's position facing said second concave spherical mirror and contiguous with the center of curvature,
    said first concave spherical mirror is located above and behind said observer's position, and
    said observer's position is located contiguous to a line from said center of curvature to the center of said second concave spherical mirror,
    whereby an aerial image of a projected visual scene is developed and functions as an object to develop an infinity virtual image which is visible at said observer's position.

2. In a simulator training apparatus as set forth in claim 1 wherein said means to project includes a spherical screen.

3. In a simulator training apparatus as set forth in claim 2 wherein said spherical screen is a rear projection screen.

4. In a simulator training apparatus as set forth in either claim 2 or 3 including projector means to produce said predetermined visual scene and to project said scene onto said spherical screen.

5. In a simulator training apparatus as set forth in claim 4 including folding mirror means to redirect said scene projected by said projector means so that said scene is reflected onto said spherical screen.

6. In a simulator training apparatus as set forth in claim 2 wherein said means to project includes two separate projector means.

7. In a simulator training apparatus as set forth in claim 6 including two observer positions located contiguous to each other and said spherical screen is of a type to reflect a scene to one of said observer positions that is projected by one of said two projector means and to reflect a different scene to the other observer positioned that is projected by the other of said two projector means.

8. In a simulator training apparatus as set forth in claim 1 wherein said means to project is pivoted a predetermined amount to develop a three-dimensional effect in the scene visible at said observer's position.

9. In a simulator training apparatus having an optical visual display to develop a realistic aerial image, said visual display comprising:
    a first concave spherical mirror positioned to focus a predetermined visual scene as an aerial image,
    a second concave spherical mirror positioned so that its concave mirror surface can focus at infinity said predetermined visual scene focused by said first spherical mirror as an aerial image, means to project said predetermined visual scene for focusing by said first concave spherical mirror as an object for said second concave spherical mirror, said means to project includes a projector to produce said predetermined visual scene and to project said scene and includes folding mirror means to redirect said scene projected by said projector and includes further a spherical screen onto which said predetermined visual scene is projected, and wherein said projector, said folding mirror means and said spherical screen are pivoted as a unit about a predetermined point to develop a three-dimensional effect in the scene visible at an observer's position, and an observer's position facing said second concave spherical mirror generally at the center of curvature, whereby an aerial image of a projected visual scene is developed and functions as an object to develop an infinity virtual image which is visible at said observer's position.

* * * * *